(12) United States Patent
MacNee, III et al.

(10) Patent No.: US 7,111,892 B2
(45) Date of Patent: Sep. 26, 2006

(54) POLYMERIC ROOF RAIL

(75) Inventors: Arthur L MacNee, III, Southgate, MI (US); Bradley R Garska, Saline, MI (US)

(73) Assignee: ASC Incorporated, Southgate, MI (US)

( * ) Notice: Subject to any disclaimer, the term of this patent is extended or adjusted under 35 U.S.C. 154(b) by 86 days.

(21) Appl. No.: 10/838,004

(22) Filed: May 3, 2004

(65) Prior Publication Data

US 2005/0242614 A1 Nov. 3, 2005

(51) Int. Cl.
*B60J 7/00* (2006.01)
(52) U.S. Cl. ............... 296/107.01; 296/104; 296/105; 296/107.09; 296/109; 296/123
(58) Field of Classification Search ............... 296/104, 296/105, 107.01, 107.09, 107.16, 108, 109, 296/123
See application file for complete search history.

(56) References Cited

U.S. PATENT DOCUMENTS

| | | | |
|---|---|---|---|
| 3,068,043 A | 12/1962 | Komeda | |
| 5,009,463 A | 4/1991 | Saitoh et al. | |
| 5,102,188 A | 4/1992 | Yamane | |
| 5,427,429 A | 6/1995 | Piontek et al. | |
| 5,772,274 A * | 6/1998 | Tokarz | 296/107.09 |
| 5,884,964 A | 3/1999 | Roeper et al. | |
| 6,033,007 A | 3/2000 | Hirschvogel et al. | |
| 6,273,500 B1 | 8/2001 | Boersma et al. | |
| 6,282,791 B1 | 9/2001 | Patelczyk | |
| 6,302,471 B1 | 10/2001 | Windpassinger et al. | |
| 6,447,046 B1 | 9/2002 | Schutt | |
| 6,902,223 B1 * | 6/2005 | Hollenbeck et al. ... | 296/107.09 |
| 2001/0042993 A1 | 11/2001 | Patelczyk | |
| 2002/0030382 A1 | 3/2002 | Hasselgruber | |
| 2002/0084673 A1 * | 7/2002 | Neubrand | 296/107.01 |
| 2003/0057728 A1 * | 3/2003 | Sims | 296/107.08 |
| 2003/0146642 A1 * | 8/2003 | Mandl et al. | 296/107.12 |
| 2003/0234553 A1 * | 12/2003 | Doncov | 296/107.09 |

OTHER PUBLICATIONS

Mohanty et al., "Spray Deposited Metal-Carbon Fiber Reinforced Polymer Hybrid Structures," Metallurgical and Materials Transactions—A—Physical Metallurgy=and Materials Science, Feb. 1, 2003.

* cited by examiner

*Primary Examiner*—Lori L. Coletta
(74) *Attorney, Agent, or Firm*—Harness, Dickey & Pierce, P.L.C.

(57) ABSTRACT

A convertible roof system uses composite roof rail(s). The composite roof rail can have portions that are made of differing materials. The composite roof rail can use universal connecting pieces for the ends of the roof rail. Adjacent composite roof rails can be formed about a connector that couples the adjacent roof rails together.

72 Claims, 9 Drawing Sheets

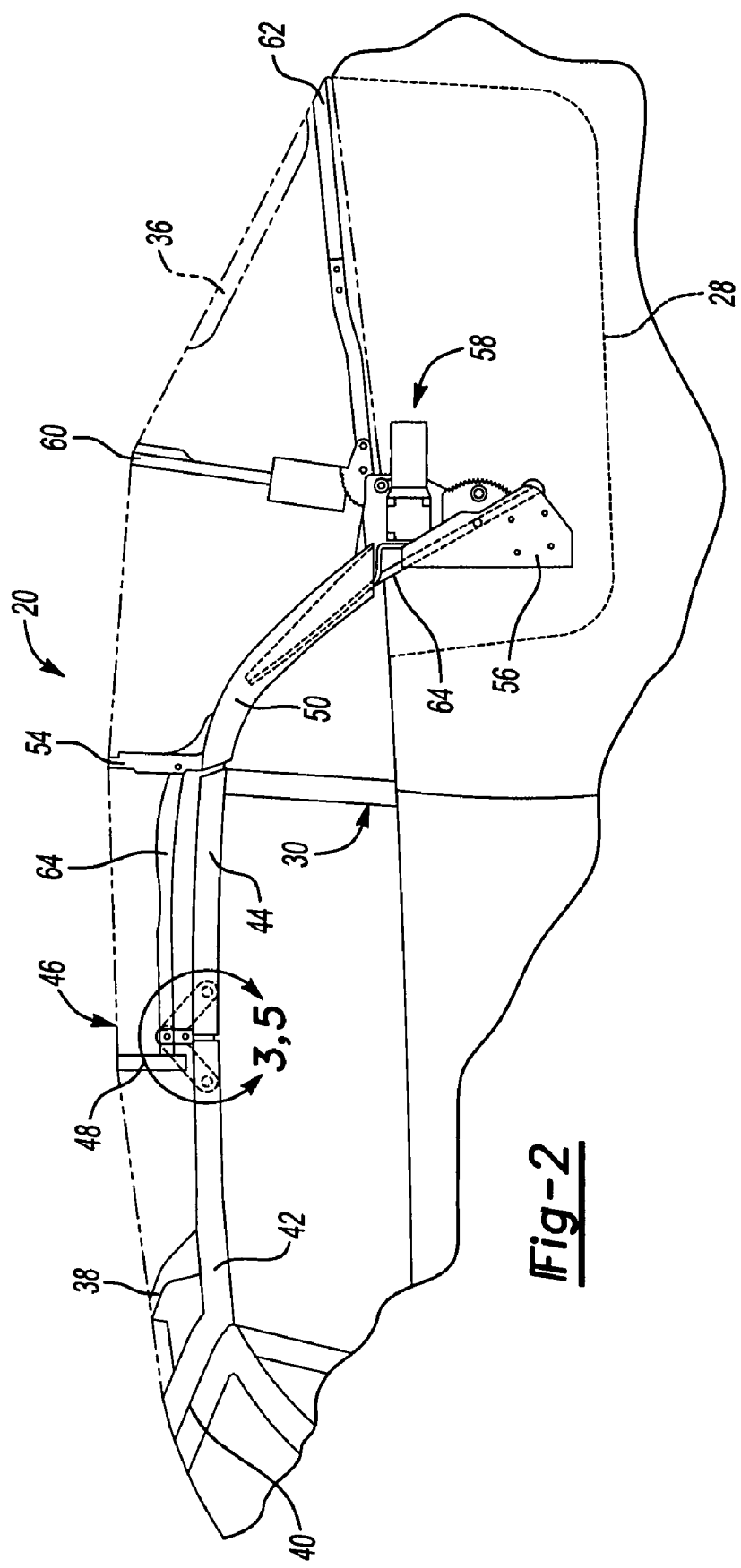

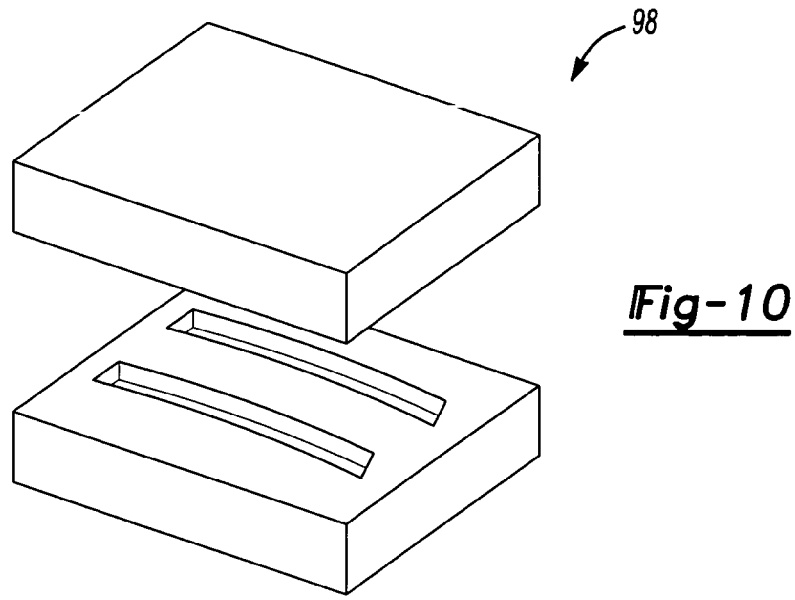
Fig-10
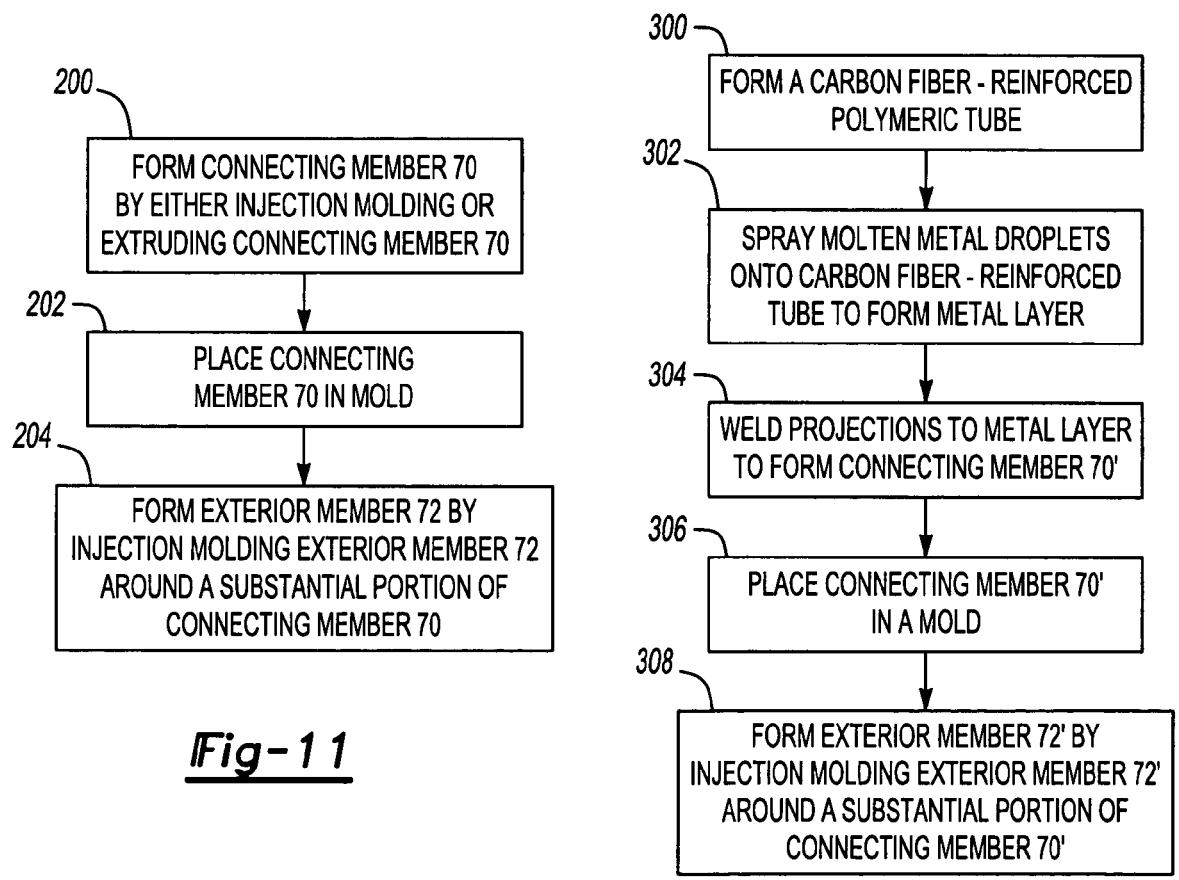
Fig-11
Fig-12

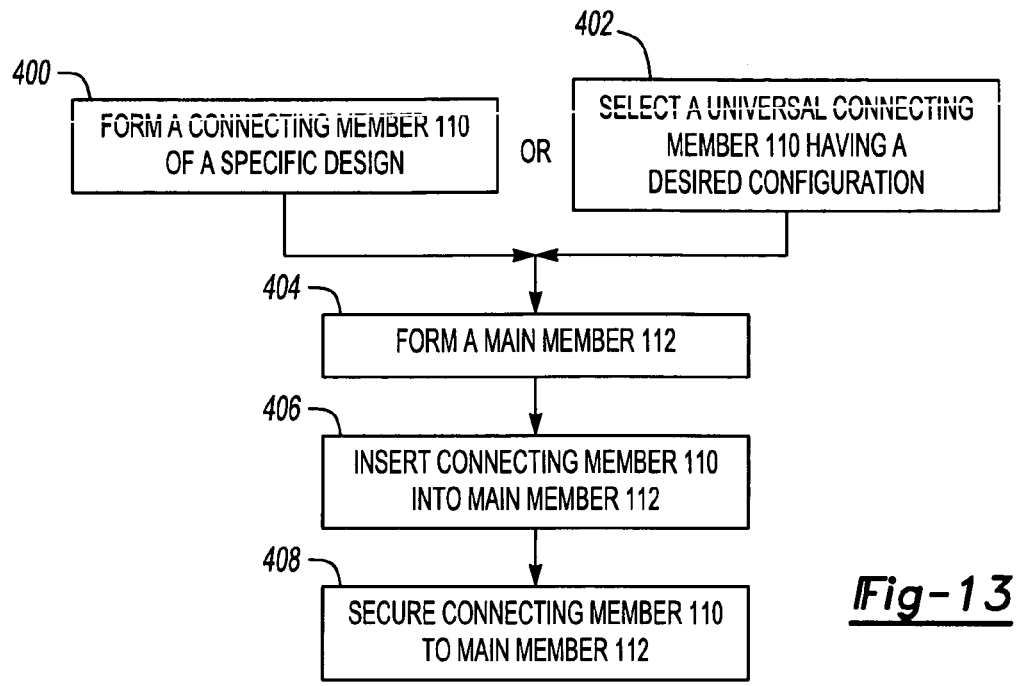
*Fig-13*
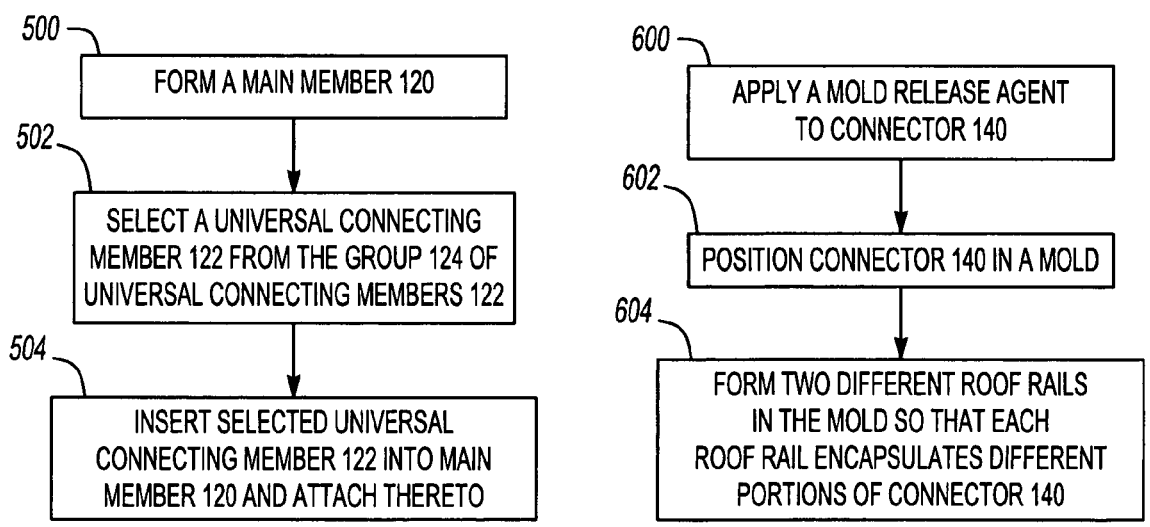
*Fig-14*              *Fig-15*

POLYMERIC ROOF RAIL

BACKGROUND AND SUMMARY OF THE INVENTION

This invention pertains generally to convertible roof systems for automotive vehicles and more specifically to a composite roof rail used in the convertible roof system.

Traditional soft-top convertible roofs for automotive vehicles typically employ a top stack mechanism that is operable between extended (raised) and retracted (stowed) positions. The top stack mechanism typically employs three, four or five roof bows, having an inverted U-shape spanning transversely across the vehicle for supporting a vinyl, canvas or polyester fabric pliable roof cover. A number one roof bow is mounted to a pair of front roof rails and is typically latched to the stationary front header panel of the automotive vehicle body disposed above the front windshield. A number two bow is typically mounted to a pair of center roof rails which are pivotally connected to the front roof rails. Furthermore, the number three, four and any additional optional roof bows are commonly mounted to a pair of rear roof rails which are pivotally coupled to the center roof rails. The roof cover can also have a hard or rigid portion along with the pliable portion. For example, reference should be made to U.S. Pat. No. 5,429,409 entitled "Convertible Top," which is incorporated by reference herein. Most traditional convertible roofs are stowed in a boot well or stowage compartment that is located aft of a passenger compartment in the vehicle. A boot or tonneau cover is then used to cover the boot well and conceal the convertible roof from view and/or protect the stowed roof from the environment.

The roof rails in the top stack mechanism are typically made of a die cast aluminum or magnesium alloy or steel. These roof rails can be heavy and/or expensive to make. Each roof rail is typically made separately and adjacent roof rails are later pivotally coupled together to form a portion of the top stack mechanism. Each of the roof rails is specifically designed for the particular application or automotive vehicle on which the top stack mechanism is employed.

In accordance with the present invention, the preferred embodiment of a convertible roof system uses a top stack mechanism that includes at least one composite roof rail that is made from different materials. The use of differing materials for the composite roof rail can provide for a less expensive roof rail with an improved strength to weight functionality. When a polymeric material is utilized, the polymeric portion of the composite roof rail can be injection molded or extruded thus providing a simple manufacture of the composite roof rail. The use of a polymeric material also facilitates the contouring of the exterior shape of the composite roof rail and can include the integration of a trim garnish feature on the interior and a seal retaining feature on the exterior of the composite roof rail thereby simplifying construction and minimizing the number of parts.

In accordance with another aspect of the present invention, a convertible roof system for an automotive vehicle includes a top stack mechanism that utilizes at least one composite roof rail that is formed of at least two different members that are attached together. The use of two different members facilitates one of the members being designed to withstand the stresses and strains in forming a portion of a coupling joint that couples the composite roof rail to another component of the top stack mechanism. The other member can then be designed to provide a desired exterior profile of the composite roof rail while reducing the weight and cost of the roof rail. The composite roof rail allows for the use of universal connecting pieces for the roof rail. A central portion of the roof rail is designed specifically for the application on which the convertible roof system is to be utilized while the end or connecting portions of the composite roof rail are selected from a group of universal roof rails. The universal connecting portion of the roof rail is chosen to provide a desired movement of the roof rail relative to the other components of the top stack mechanism to which it is coupled. The use of universal connecting pieces is advantageous by reducing the tooling costs associated with designing connecting pieces specific for each roof rail for each automotive vehicle upon which a convertible roof system is desired to be utilized.

In still another aspect of the present invention, the convertible roof system uses as top stack mechanism wherein first and second roof rails are formed around a connector that pivotally couples the first and second roof rails together. The two roof rails and connector can be produced in a common or single mold that is designed for the two roof rails and the connector. The molding of the two roof rails around the connector that pivotally couples them together is advantageous over the typical convertible roof systems in that the roof rails are removed from the mold already pivotally coupled together thereby simplifying the assembly of a top stack mechanism.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a side elevation view of the vehicle and convertible roof system of FIG. 1 with the convertible roof in the raised position;

FIG. 10 is a perspective view of a mold that can be used to form composite roof rails according to the principles of the present invention;

FIG. 11 is a block diagram illustrating the steps of producing a composite roof rail according to the first preferred embodiment;

FIG. 12 is a block diagram illustrating the steps of producing an alternate composite roof rail according to the first preferred embodiment;

FIG. 13 is a block diagram illustrating the steps of producing a composite roof rail according to the second preferred embodiment;

FIG. 14 is a block diagram illustrating the steps of producing a composite roof rail according to the third preferred embodiment; and FIG. 15 is a block diagram illustrating the steps of producing a composite roof rail according to the forth preferred embodiment.

DETAILED DESCRIPTION OF THE PREFERRED EMBODIMENTS

The following description of the preferred embodiments is merely exemplary in nature and is in no way intended to limit the invention, its application, or uses.

Figure 1A:
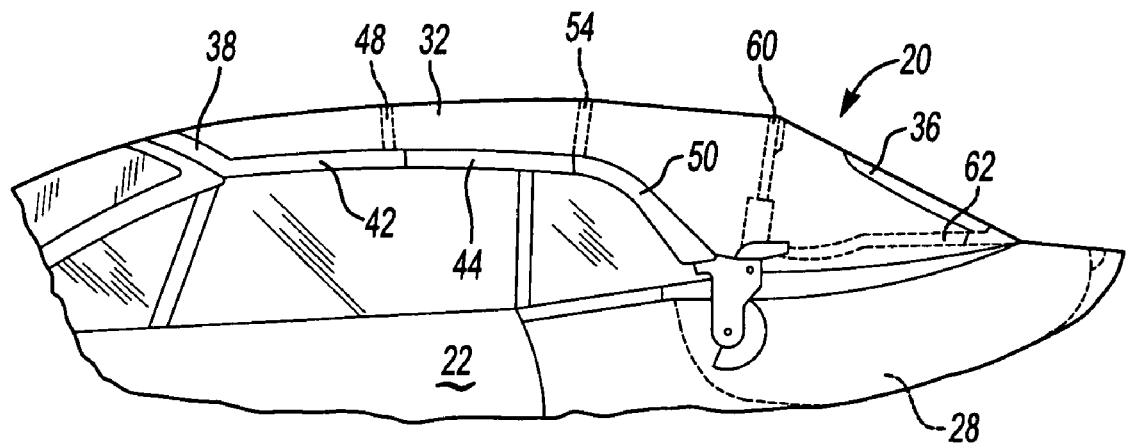
FIGS. 1A–E are perspective views of a convertible roof system according to the principles of the present invention employed on an automotive vehicle with the convertible roof in various positions between a raised position and a stowed position.
Figure 1B:
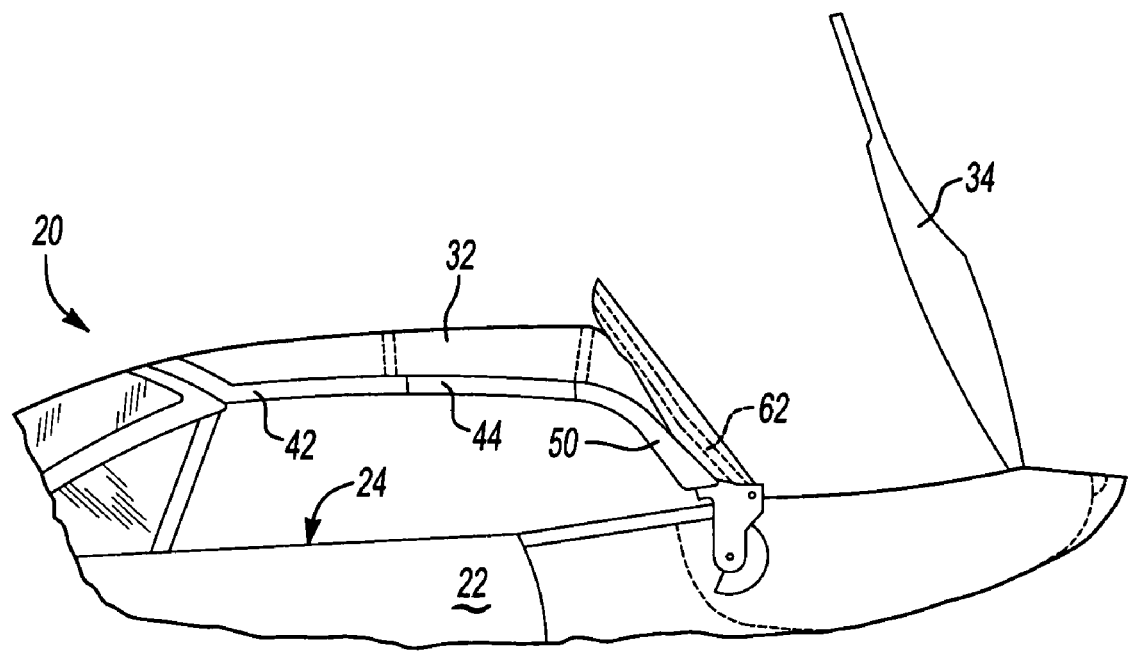
Figure 1C:
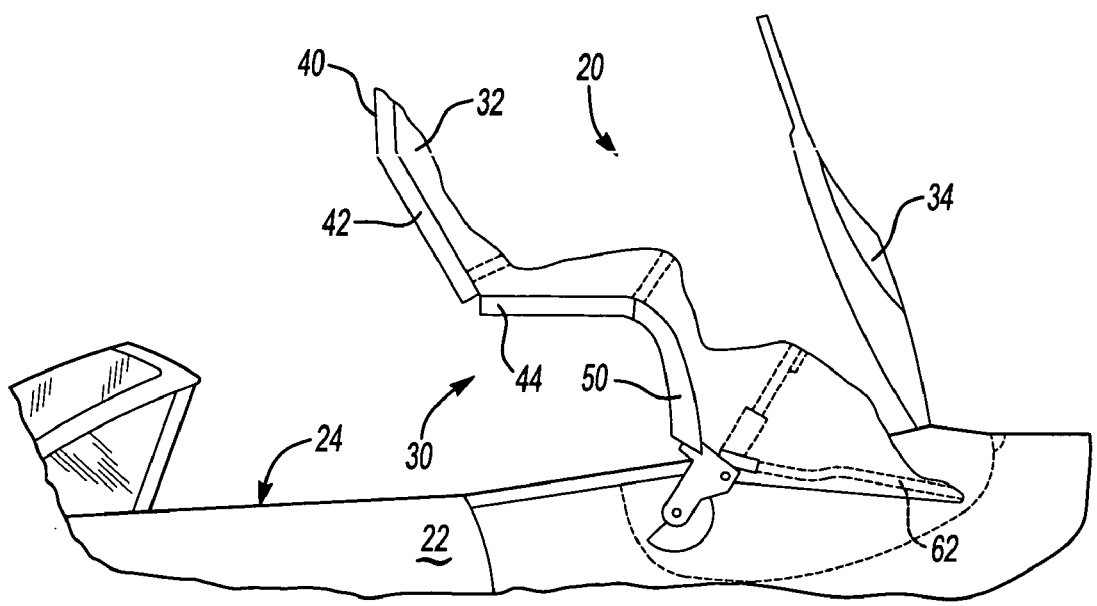
Figure 1D:
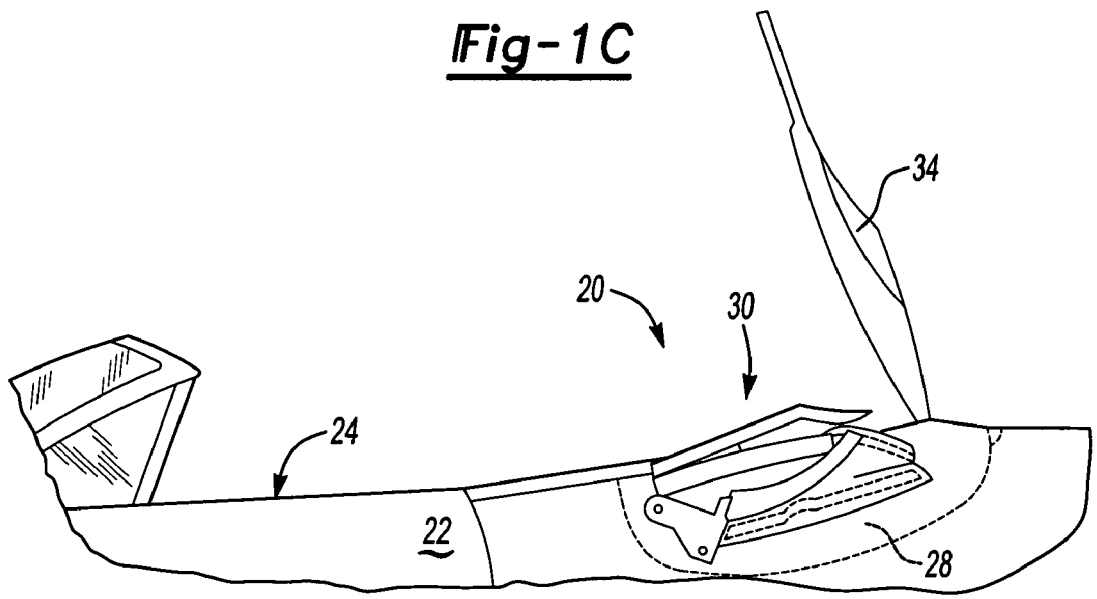
Figure 1E:
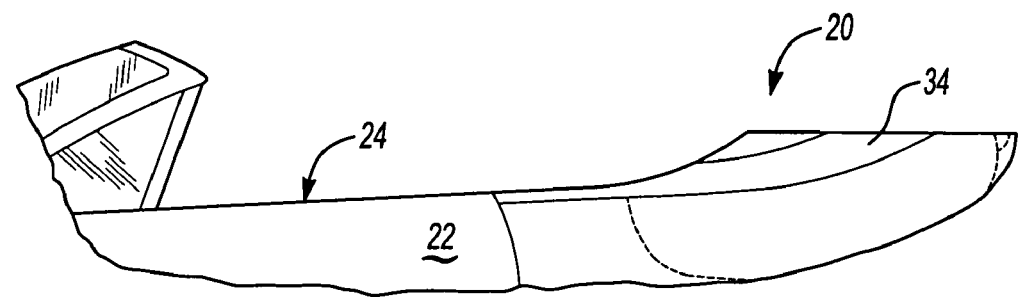

Referring to FIGS. 1A–E, a convertible roof system 20 according to the principles of the present invention is shown installed on an automotive vehicle 22 having a passenger compartment 24 and a stowage compartment 28. Convertible roof system 20 is the type utilizing a folding or top stack mechanism 30 that partially supports a roof cover 32 and is operable between a fully raised or extended position, as shown in FIG. 1A, through intermediate positions such as those shown in FIGS. 1B–D, and a fully stowed or retracted position within stowage compartment 28 beneath a tonneau cover 34, as shown in FIG. 1E.

Roof cover 32 includes a window or backlite 36 and is made from a pliable material, such as vinyl, canvas or a polyester fabric. If desired, roof cover 32 can also include a hard or rigid portion that optionally can be covered by the same material that comprises the soft pliable portion of the roof cover to give a uniform appearance. Backlite 36 is attached to roof cover 32 and may (not shown) or may not be pivotally coupled to top stack mechanism 30. For example, reference should be made to U.S. Pat. No. 5,887,936 entitled "Backlite System For Use In An Automotive Vehicle Convertible Roof," by Cowsert, and U.S. Pat. No. 6,102,467 entitled "Backlite Retention System For Use In An Automotive Vehicle Convertible Roof," by Laurain et al, the disclosures of which are herein incorporated by reference. Backlite 36 can be made of either a pliable transparent vinyl material, as shown, or a rigid material, such as glass or polycarbonate (not shown).

Convertible roof system 20 and top stack mechanism 30 are generally symmetrical about a longitudinal, fore-and-aft centerline (not shown) of vehicle 22. Top stack mechanism 30 includes right and left roof linkages on the respective right and left sides of vehicle 22. For brevity, only the left side of top stack mechanism 30 is shown and discussed, however, it should be understood that right side linkages are also provided as part of top stack mechanism 30 and are mirrored images of the left side. Also, when using the terms "fore" and "aft" and "front" and "back" in describing components of top stack mechanism 30, such reference refers to the orientation of the components when top stack mechanism 30 is in the fully raised position.

Referring now to FIG. 2, top stack mechanism 30 includes a first or forwardmost roof bow 38 that extends transversely across vehicle 22 and has a front edge 40 that is latched to a stationary front header panel of vehicle 22 disposed above and behind the front windshield when in the fully raised position. First roof bow 38 is fixedly connected to a front roof rail 42. Alternatively, first roof bow 38 could be pivotally connected to front roof rail 42 when an outfolding convertible roof is desired. Front roof rail 42 is pivotally coupled to a center roof rail 44. A number two or second roof bow 48 is attached to multi-link assembly 46 and extends transversely across vehicle 22. Center roof rail 44 is pivotally coupled to a rear roof rail 50. A third roof bow 54 is attached to a front portion of rear roof rail 50. Rear roof rail 50 is pivotally coupled to a bracket 56 which is affixed to vehicle 22. Rear roof rail 50 is also coupled to a driving mechanism 58 which is operable to move top stack mechanism 30 from its extended position to its retracted position. A fourth roof bow 60 is pivotally coupled to top stack mechanism 30. A fifth or rearmost roof bow 62 is pivotally coupled to top stack mechanism 30 and allows the rearmost portion of convertible roof system 20 to be raised to allow tonneau cover 34 to move between open and closed positions, as shown in FIGS. 1A–E. A balance link 64 has a forward end pivotally coupled to multi-link assembly 46 and an opposite rearward end pivotally coupled to bracket 56. The above described top stack mechanism 30 is essentially the same as that disclosed in U.S. Pat. No. 5,722,274 entitled "Motorized Drive System For A Convertible Roof Of An Automotive Vehicle," which issued to Tokarz, the disclosure of which is incorporated by reference herein.

Figure 3:
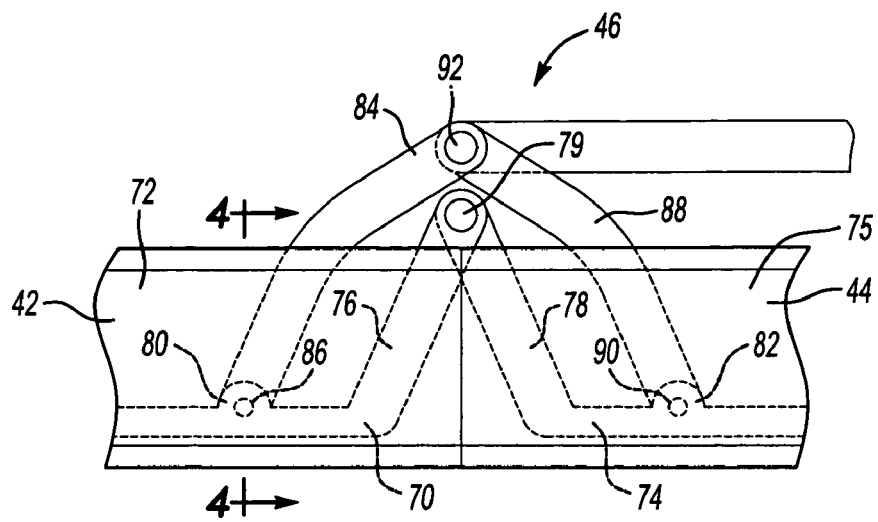
FIG. 3 is an enlarged fragmented side elevation view of a portion of two adjacent roof rails of a first preferred embodiment of the convertible roof system of FIG. 2 within circle 3.

Referring now to FIG. 3, a first preferred embodiment of the convertible roof system 20 according to the principles of the present invention is shown. In the first preferred embodiment, roof rails 42, 44 and 50 are composite roof rails that are each formed with at least two different materials. In other words, a portion of each of the roof rails is formed from a first material while a different portion of each of the roof rails is formed from a second material that is different than the first material. For example, front roof rail 42 has a connecting member or portion 70 that extends substantially the length of the roof rail and is used to couple front roof rail 42 to other components of top stack mechanism 30, such as center roof rail 44 and first roof bow 38 (connection not shown). Front roof rail 42 also has an exterior member or portion 72 that forms a majority of the exterior contour of front roof rail 42. Similarly, center roof rail 44 also has a connecting member or portion 74 that extends substantially the length of the roof rail and is used to couple center roof rail 44 to other components of top stack mechanism 30, such as front roof rail 42 and rear roof rail 50, and an exterior member or portion 75 that forms a majority of the exterior contour of center roof rail 44. Connecting members 70, 74 are fixedly attached to their respective exterior members 72, 75 to form composite roof rails that are unified structural members.

In the particular configuration of convertible roof system 20, a projection 76 of connecting member 70 of front roof rail 42 is pivotally coupled to a projection 78 of connecting member 74 of center roof rail 44 at pivot 79 thereby pivotally coupling front and center roof rails 42, 44 together. Additionally, each connecting member 70, 74 also has respective projections 80, 82 that are operable to couple front and center roof rails 42, 44 to other components of top stack mechanism 30. Specifically, projection 80 on front roof rail 42 is pivotally coupled to a link 84 at pivot 86 while projection 82 on center roof rail 44 is pivotally coupled to another link 88 at pivot 90. Links 84, 88 are pivotally coupled to one another at pivot 92 and thereby form multi-link assembly 46. Specifically, multi-link assembly 46 is a 4-bar linkage assembly comprising front roof rail 42 (connecting member 70) links 84, 88 and center roof rail 44 (connecting member 74) and defined by pivots 86, 92, 82, 79. It should be appreciated that connecting members 70, 74 could have additional projections, as needed, to couple to other components of top stack mechanism 30.

Figure 4A:
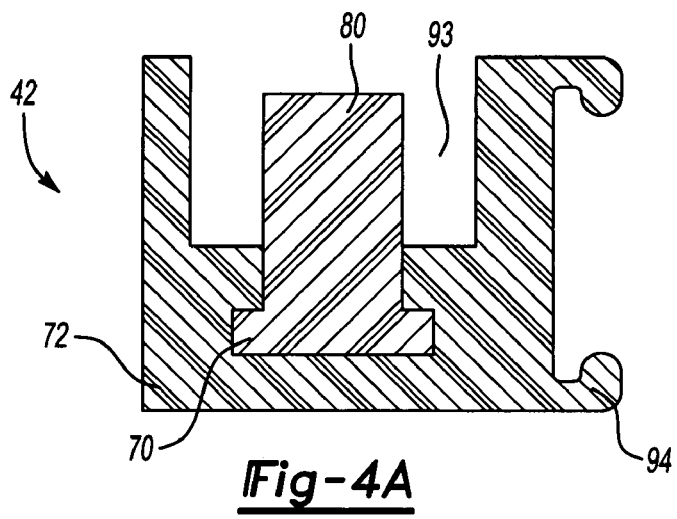
FIG. 4A is a cross-sectional view of a portion of the first preferred embodiment of the composite roof rail of FIG. 3 along line 4—4 showing the use of two different materials to produce the composite roof rail and having an integral seal retainer.

Referring now to FIG. 4A, a cross-sectional view of a portion of front roof rail 42 along line 4—4 in FIG. 3 according to the first preferred embodiment is shown. As can be seen, exterior member 72 has a central channel 93 that extends along a portion of the length of front roof rail 42 and allows extensions of connecting member, such as projection 80, to extend outwardly beyond exterior member 72 and into channel 93 so that it can be coupled to another component of top stack mechanism 30. In this embodiment, connecting member 70 is made from a first type of polymeric material while exterior member 72 is made from a different type of polymeric material. Specifically, connecting member 70 is made from a polymeric material that is capable of withstanding the stresses and strains associated with controlling the movement of front roof rail 42 in response to movement of top stack mechanism 30, stresses and strains associated with the torsion of front roof rail 42 in response to movement of vehicle 22, and stresses and strains associated with the load of the weather seals to the side glass. There are a variety of polymeric materials that are capable of being used to produce connecting member 70. For example, connecting member 70 can be made from an engineering grade polymer, a thermal plastic polyamide, such as Zytel FN available from Dupont Co. of Wilmington, Del., a nylon 6/6, a nylon 6/12, and related co-polymers. These materials may or may not be filled with glass fiber depending on the design requirements. Connecting member 70 can be formed by injection molding in a mold 98, as shown in FIG. 10, or in an extrusion process. Preferably, connecting member 70 is injection molded. In contrast, exterior member 72 does not need to be as strong as the material used to make connecting member 70 due to exterior member 72 not being subjected to the same stresses and strains associated with controlling the movement of front roof rail 42. As such, exterior member 72 is made from a less expensive polymeric material, such as PVC, ABS or the like. These materials may or may not be filled with glass fiber depending on the design requirements. Exterior member 72 can also be made by injection molding in a mold 98, as shown in FIG. 10.

Referring now to FIG. 11, to make front roof rail 42, connecting member 70 is first formed by either injection molding or extruding connecting member 70, as indicated in block 200 and as mentioned above. Connecting member 70 is then situated in an injection mold that is used to make exterior member 72, as indicated in block 202. With connecting member 70 positioned within the mold, exterior member 72 is then injection molded around a substantial portion of connecting member 70, as indicated in block 204, thereby encapsulating a majority of connecting member 70 within exterior member 72. The encapsulation of connecting member 70 within exterior member 72 secures connecting member 70 and exterior member 72 together and forms a unified structural member that serves as front roof rail 42. Exterior member 72 is configured to provide a desired exterior contour for front roof rail 42. As such, a seal retainer 94, such as a weather strip retainer, can be formed integrally with exterior member 72. With the forming of seal retainer 94 integral with exterior member 72, a subsequent step of attaching a separate aluminum or steel seal retainer (not shown) to front roof rail 42 is avoided. It should be appreciated that other surface features can also be incorporated into exterior member 72 during the injection molding process to further eliminate other parts or components that would be later added to front roof rail 42 to secure various other components of convertible roof system 20 thereto. For example, a desired exterior surface contour of the roof rail can be formed to avoid the need for interior trim garnish.

It should be appreciated that an opposite end of front roof rail 42 will also have portions of connecting member 70 extending outwardly from exterior member 72 to allow the opposite end of front roof rail 42 to be coupled to other components of top stack mechanism 30. Additionally, depending upon the specific design of convertible roof system 20, intermediate portions of front roof rail 42 can also have portions of connecting member 70 extending outwardly beyond exterior member 72 to facilitate coupling of that portion of front roof rail 42 to other components of top stack mechanism 30. Furthermore, it should also be appreciated that center roof rail 44 and rear roof rail 50 also have a similar construction wherein each is comprised of a connecting member and an exterior member that have functionality similar to that described above with reference to front roof rail 42. Thus, in the first preferred embodiment roof rails 42, 44 and 50 are each composite roof rails comprised of a connecting member made of a first material and an exterior member made of a second material that is different than the first material.

Figure 4B:
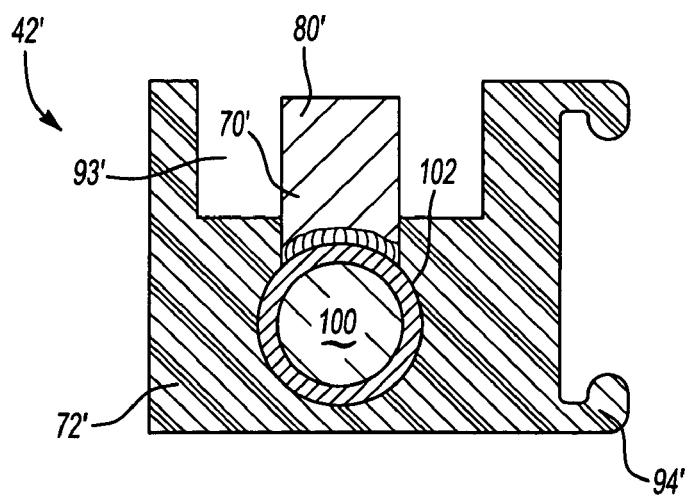
FIG. 4B is a cross-sectional view of a portion of an alternate embodiment of the first preferred embodiment of the composite roof rail of FIG. 3 along line 4—4.

Referring now to FIG. 4B, an alternate embodiment of the first preferred embodiment of convertible roof system 20 is shown. In this alternate embodiment, connecting member 70' is not made of a single polymeric material. Rather, connecting member 70' is a fiber-reinforced polymeric composite having a metal spray deposited thereon. Specifically, a carbon fiber reinforced polymeric tubular structure 100 having a spray deposited metal 102, such as steel, thereon is utilized. Connecting member 70' can be made, as shown in FIG. 12, by creating a traditional carbon fiber-reinforced polymeric tube of a desired shape and orientation, as indicated in block 300, and then creating a consolidated layer of the desired metal material by spraying molten metal droplets onto the carbon fiber-reinforced polymeric tube with, for example, a twin-wire arc spray gun in air, as indicated in block 302. For more information on this type of carbon fiber reinforced polymeric tubular structure, see P. S. Mohanty and A. Argento, *Spray Deposited Metal-Carbon Fiber Reinforced Polymer Hybrid Structures*, Metallurgical and Materials Transactions—A, Feb. 1, 2003. Projections, such as 76' (not shown) and 80' are attached to connecting member 70 by welding the projections to metal 102 surrounding tubular structure 100, as indicated in block 304. In this embodiment, the projections are made of a metal that is easily welded to spray deposited metal 102 surrounding tubular structure 100. For example, spray deposited metal 102 can be steel and the projections can also be made of the same type of steel to thereby facilitate the attachment by welding. Exterior member 72' is made from the same material as discussed above with reference to the first preferred embodiment of convertible roof system 20. Once connecting member 70' has been formed, connecting member 70' is placed in a mold, such as mold 98 shown in FIG. 10, as indicated in block 306, and exterior member 72' is injection molded around connecting member 70', as indicated in block 308, to encapsulate a majority of connecting member 70' thereby attaching connecting member 70' and exterior member 72' together. The use of tubular structure 100 surrounded by a spray deposited metal 102 provides improved mechanical properties, such as an extremely high stiffness in conjunction with a low weight.

Figure 5:
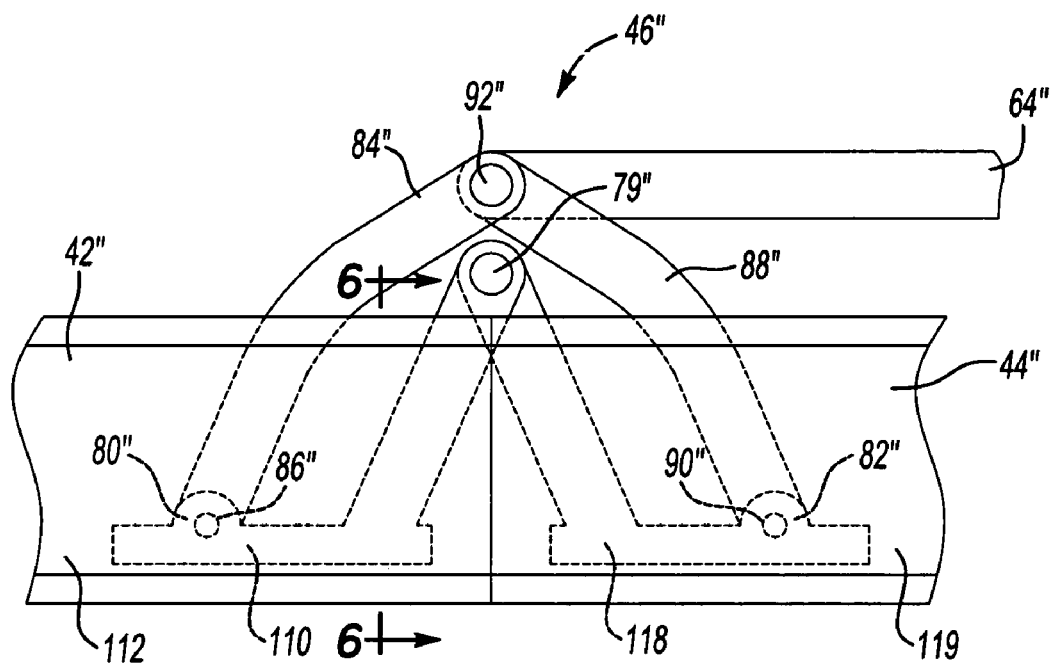
FIG. 5 is an enlarged fragmented side elevation view of a portion of two adjacent roof rails of a second preferred embodiment of the convertible roof system of FIG. 2 within circle 5.
Figure 6:
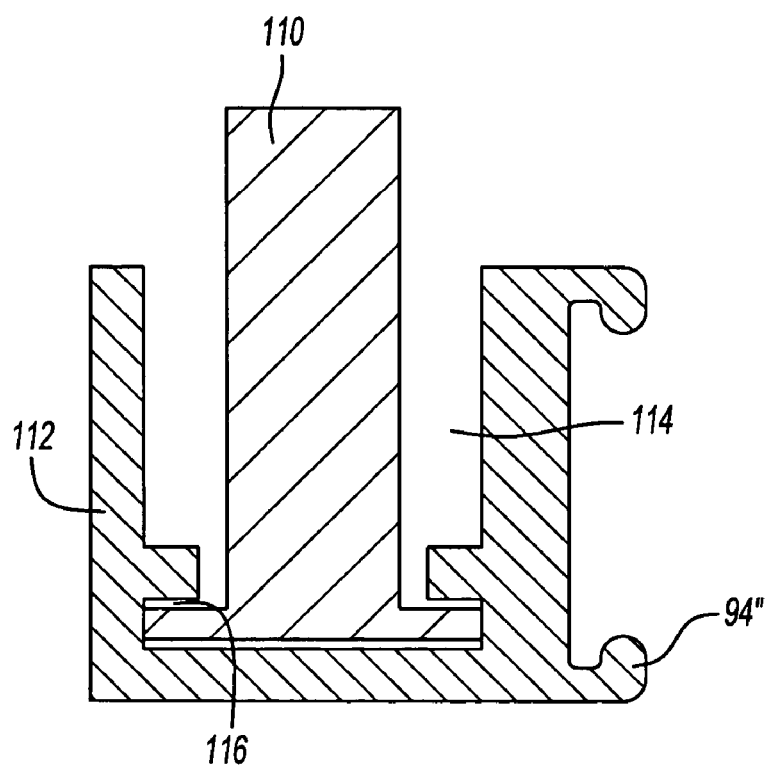
FIG. 6 is a cross-sectional view of a portion of the composite roof rail of FIG. 5 along line 6—6.

Referring now to FIGS. 5 and 6, a portion of a second preferred embodiment of a convertible roof system 20 according to the principles of the present invention is shown. FIG. 5 shows a portion of front and center roof rails 42", 44" and of top stack mechanism 30 while FIG. 6 shows a cross-sectional view of a portion of front roof rail 42" along line 6—6 of FIG. 5. In the second preferred embodiment each of the roof rails 42", 44", 50" are composite roof rails that are formed with at least two different members that are attached together to form the composite roof rail. Specifically, each roof rail has a connecting member that is operable to couple the roof rail to another component of the top stack mechanism and a main member that forms a majority of the roof rail and provides a desired exterior contour for the roof rail. For example, front roof rail 42" has a connecting member 110 that is positioned within a portion of and secured to a main member 112.

Connecting member 110 does not extend the entire length of front roof rail 42", as is the case with connecting member 70 in the first preferred embodiment discussed above. Rather, connecting member 110 extends a portion of the way into main member 112 a distance sufficient to be securely attached thereto and to also provide extensions for coupling front roof rail 42" to other components of top stack mechanism 30 as required by the design of the top stack mechanism. Main member 112 provides a desired exterior contour for front roof rail 42" and is designed to withstand the loading applied by connecting member 110 onto main member 112 during movement of top stack mechanism 30, stresses and strains associated with the torsion of front roof rail 42 in response to movement of vehicle 22, and stresses and strains associated with the load of the weather seals to the side glass. Main member 112, as best seen in FIG. 6, includes a channel 114 that extends along an entirety of its length. Alternatively, channel 114 can extend only a portion of the length of main member 112 a distance sufficient to position connecting member 110 in a desired location. Channel 114 has a lower opening 116 that is configured to receive a lower portion of connecting member 110. To assemble composite roof rail 42", the lower portion of connecting member 110 is inserted into lower opening 116 in main member 112 to a desired position. Connecting member 110 can be secured to main member 112 by a fastener, such as a screw, a pin, etc. (not shown). Alternatively, connecting member 110 can be secured to main member 112 by providing a slip fit or interference fit between the lower portion of connecting member 110 and lower opening 116 of main member 112 and/or an adhesive (not shown) can be utilized to facilitate the attachment of connecting member 110 to main member 112.

Connecting member 110 is designed to withstand the stresses and strains associated with coupling front roof rail 42" to other components of top stack mechanism 30, such as a center roof rail 44", link 84", and/or a roof bow (connection not shown). As such, connecting member 110 is preferably made from a material capable of withstanding the stresses and strains associated with the movement of top stack mechanism 30, stresses and strains associated with the torsion of front roof rail 42 in response to movement of vehicle 22, and stresses and strains associated with the load of the weather seals to the side glass. A variety of materials can used to form connecting member 110. For example, connecting member 110 can be a metal such as aluminum, steel or magnesium or it can be made from a polymeric material, such as a thermal plastic polyamide. Connecting member 110 can be formed by extrusion, forging, injection or cast molding in mold 98, or other methods. Connecting member 110 can be designed specifically for the particular design of top stack mechanism 30 and convertible roof system 20 or can be selected from a group of universal connecting members that have already been designed in which case connecting member 110 is selected to provide the appropriate motion of the roof rail to which connecting 110 is to be employed, as discussed below. Main member 112, as stated above, functions to provide a desired exterior contour for the roof rail but, in this embodiment, also functions to provide structural support and rigidity for the roof rail. Therefore, main member 112 must be capable of withstanding the stresses and strains applied to the roof rail by connecting member 110 and the stresses and strains associated with the torsion of front roof rail 42 in response to movement of vehicle 22, and the stresses and strains associated with the load of the weather seals to the side glass. Main member 112 can be made from a variety of materials that are capable of performing these functions. For example, main member 112 can also be made from a metal, such as aluminum or magnesium or can be made from a polymeric material, such as a thermal plastic polyamide or, possibly, a lower strength polymeric material that is capable of withstanding the above-described stresses. Main member 112 can be produced by extrusion, forging, injection or cast molding in mold 98 and the like. Main member 112 is preferably formed with an integral seal retainer 94" that is configured to retain a seal, such as weather stripping.

Similarly, second roof rail 44" is also formed by the attachment of a connecting member 118 that is attached to a main member 119. Again, connecting member 118 is operable to couple center roof rail 44" to other components of the top stack mechanism while main member 119 provides a desired exterior contour for center roof rail 44" along with being operable to transmit forces along the length of center roof rail 44". It should be appreciated that opposite ends of front and center roof rails 42", 44" will also have respective connecting members 110, 118 extending outwardly from main members 112, 119 to allow the opposite ends to be coupled to other components of the top stack mechanism. Furthermore, it should also be appreciated that the rear roof rail will have a similar construction to that of front and center roof rails 42", 44". Thus, in the second preferred embodiment, as shown in FIG. 13, the composite roof rails are made by: (1) either forming a connecting member 110 of a specific design, as indicated in block 400 or selecting of a connecting member 110 from a group of universal connecting members having a desired configuration, as indicated in block 402; (2) forming a main member 112, as indicated in block 404; (3) inserting connecting member 110 into main member 112, as indicated in block 406; and (4) securing connecting member 110 to main member 112, as indicated in block 408, thereby forming the composite roof rail. The connecting and main members can be made from different materials or the same material, depending upon the design of the convertible roof system.

Figure 7:
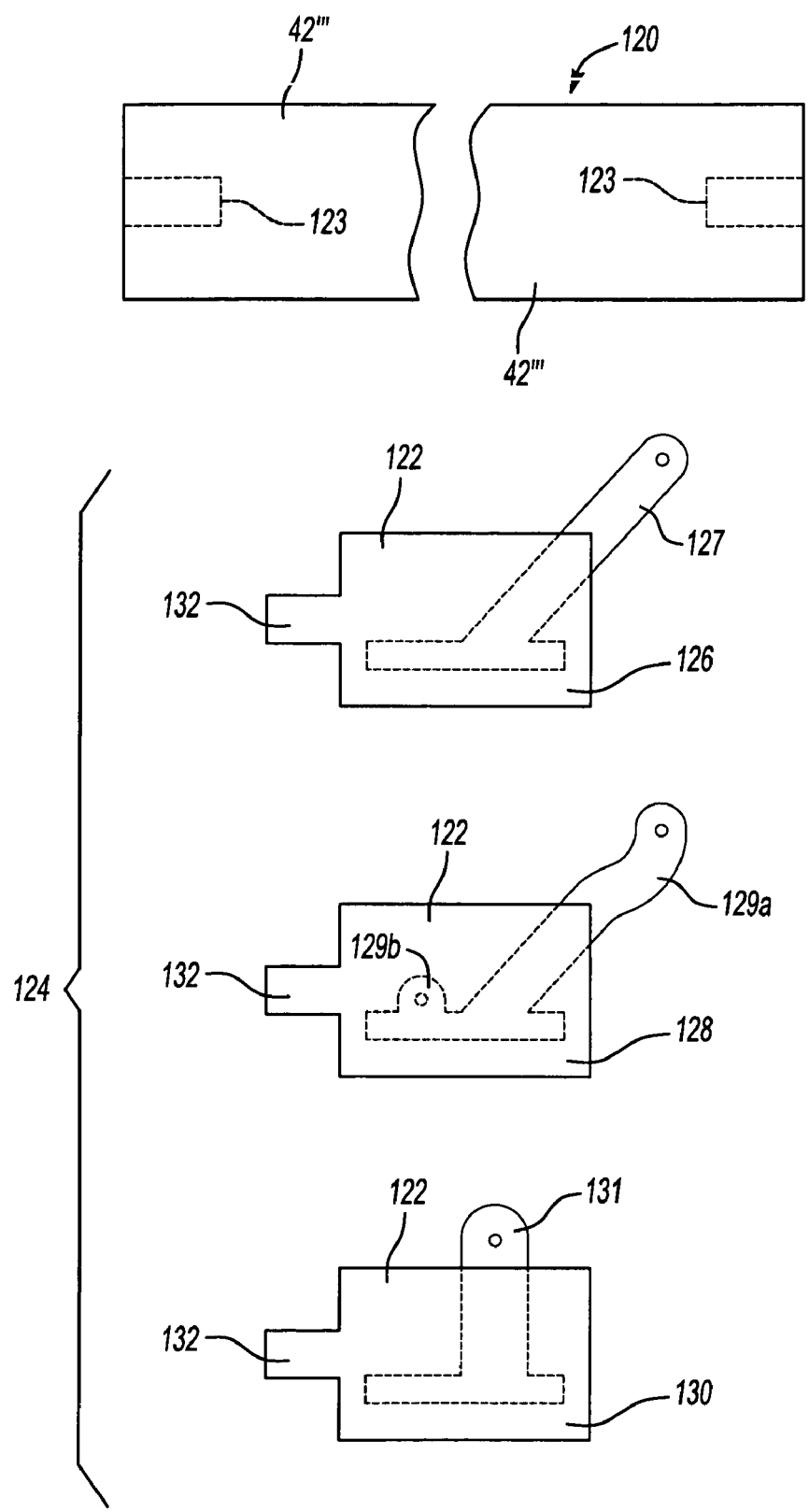
FIG. 7 is a side elevation view of a central portion of a composite roof rail and a group of universal connecting members according to the principles of the present invention.

Referring now to FIG. 7, a third preferred embodiment of a composite roof rail according to the principles of the present invention is shown. In this embodiment, the composite roof rail is similar to that disclosed above with reference to the second preferred embodiment and shown in FIGS. 5–6 in that the composite roof rail is formed by attaching two or more discrete members together to form the composite roof rail. In this embodiment, the composite roof rail is formed of a main or central member 120 that forms a majority of the composite roof rail and a connecting member 122 which is attached to an end of central member 120 and is operable to couple the composite roof rail to other components of the top stack mechanism. Main member 120 is designed for the specific application or vehicle 22 on which convertible roof system 20 is to be employed. That is, the contouring, length and dimensions of main member 120 are designed for the specific application. Each main member 120 has an opening or channel 123 that is designed to receive a complementary portion of a connecting member 122 to facilitate the connection of the connecting member 122 to main member 120, as described below. Main member 120 can be made from a variety of materials. For example, main member 120 can be made of a metal, such as aluminum or magnesium or a polymeric material such as a thermal plastic polyamide or a weaker type of polymeric material depending upon the design of convertible roof system 20. Main member 120 can be formed in a variety of ways. For example, main member 120 can be formed by extrusion, forging, injection or cast molding in mold 98, or other methods depending upon the design of convertible roof system 20.

Connecting member 122 is a universal connecting member that is selected from a group 124 of universal connecting members that are each designed to provide a different type of coupling for the composite roof rail in which it is used. For example, a first universal connecting member 126 has a projection 127 that extends outwardly at an angle relative to the connecting member and has a single opening for pivotally coupling to another component of the top stack mechanism. A second universal connecting member 128 can have a pair of projections 129a, 129b that extend upwardly at different locations and/or in different orientations relative to the first connecting member 126 that allow the composite roof rail to be coupled at two different locations to other component(s) of the top stack mechanism. There can be a third universal connecting member 130 that also has a single projection 131 that extends upwardly from the universal connecting member and is operable to couple the composite roof rail on which it is used to another component of the top stack mechanism. Each of the universal connecting members 126, 128, 130 within group 124 is provided with an identical connecting projection 132, such as the horizontal projection shown in FIG. 7. Connecting projection 132 is complementary to channel 123 in main member 120 and facilitates the connection of the universal connecting member 122 to main member 120.

Each universal connecting member 126, 128, 130 can be a solid single piece or can be a composite piece wherein it is comprised of two different materials and/or two different members that are attached together to form the universal connecting member, such as the composite roof rails discussed above. Universal connecting members 126, 128, 130 are each designed to provide a unique or specific motion when coupled to another component of the top stack mechanism so that a specific connecting member can be selected to provide a desired motion for the composite roof rail of which it forms a part of. Thus, universal connecting members 122 are not specifically designed for the application or the vehicle 22 on which convertible roof system 20 is employed but, rather, are designed to provide some general movements or constraints of movements and are selected based upon the type of movement each universal connecting member can supply.

Each universal connecting member can be made from a variety of materials. For example, universal connecting members can be made from a metal, such as aluminum, magnesium or steel or a polymeric material, such as a thermal plastic polyamide. Additionally, as stated above, different portions of each universal connecting member can be made of different materials that are selected to provide a desired functionality for the universal connecting member. As such, each of the universal connecting members can be made in a variety of ways. For example, the universal connecting members can be extruded, injection molded or cast molded in mold 98 or the like.

Referring now to FIG. 14, to assemble a composite roof rail of the third preferred embodiment, the main member 120 is formed, as indicated in block 500, and then a universal connecting member 122 is selected from the group 124 of universal connecting members 122, as indicated in block 502. The selected universal connecting member 122 is then inserted into the main member 120 and attached thereto, as indicated in block 504. Universal connecting member 122 can be attached to main member 120 by a mechanical fastener, such as a screw, bolt, clevis pin, or the like (not shown). Alternatively, the selected universal connecting member 122 can be press fit, interference fit, or slip fit into the main member 120. Additionally, an adhesive (not shown) can be used by itself or in conjunction with the other fastening methods to connect the selected universal connecting member 122 to main member 120. Thus, the selected universal connecting member 122 can be secured to main member 120 in a variety of ways to form a composite roof rail that is a unified structural component of top stack mechanism 30.

Thus, in the third preferred embodiment, the main portions of the composite roof rails are designed to provide a desired orientation and configuration for the roof rail while the end portions or connecting portions are selected from a group of universal end portions that provide a desired motion for the composite roof rail.

Figure 8:
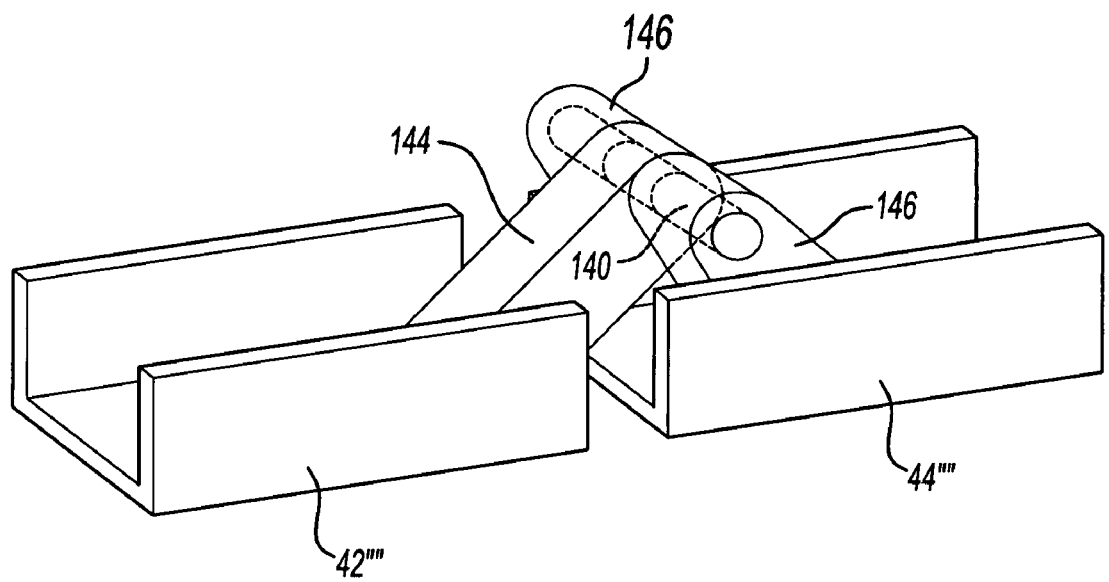
FIG. 8 is a perspective view of a third alternate embodiment of a pair of roof rails for a convertible roof system according to the principles of the present invention wherein the two roof rails are molded around a coupling pin that couples the two roof rails together.
Figure 9:
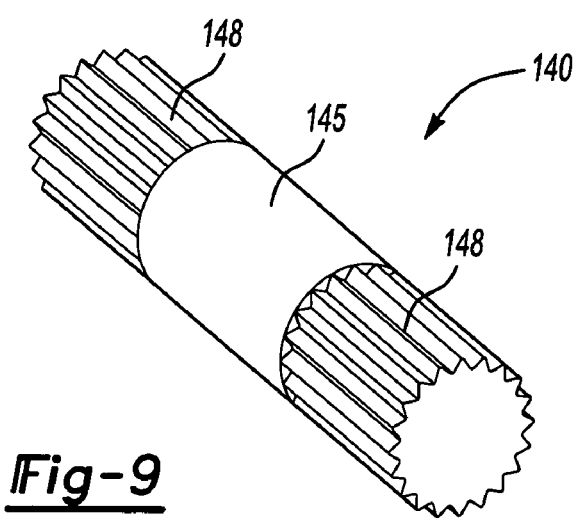
FIG. 9 is a perspective view of the pin of FIG. 8 showing the application of a mold release agent to the pin.

Referring now to FIGS. 8 and 9, a fourth preferred embodiment of a composite roof rail according to the principles of the present invention is shown. In this embodiment, the composite roof rail is comprised of a pair of adjacent roof rails that are pivotally coupled together and formed around a common pivot joint, such as a connector or pin 140. That is, the composite roof rail, which includes adjacent roof rails and a joint coupling the two roof rails together, are formed in a common mold, such as the mold 98 shown in FIG. 10, during the manufacturing process. Specifically, referring to FIG. 15, pin 140 is positioned within a mold, as indicated in block 602, and front roof rail 42'''' and center roof rail 44'''' are formed around pin 140 so that each of the roof rails encapsulates a different portion of pin 140, as indicated in block 604. For example, as shown in FIG. 8, front roof rail 42'''' has a single connecting projection 144 that encapsulates a central portion 145 of pin 140 while center roof rail 44'''' has as pair of connecting projections 146 that encapsulate end portions 148 of pin 140 with connecting projection 144 interposed therebetween. To prevent pin 140 from adhering to both connecting projection 144 and pair of connection projections 146, a portion of pin 140, either central portion 145 or end portions 148, are provided with a mold release agent that inhibits the adhering of pin 140 to the particular connecting projections 144, 146, as indicated in block 600. The other portion(s) of pin 140 can be knurled to facilitate the attachment of pin 140 to the associated connecting projection(s). This enables front and center roof rails 42'''', 44'''' to pivot relative to one another about pin 140 while pin 140 remains stationary relative to either connecting projection 144 or pair of connecting projections 146.

In this embodiment, front and center roof rails 42'''', 44'''' can be made from a metal, such as aluminum, magnesium or steel or a polymeric material, such as an engineering grade polymer or thermal plastic polyamide. Pin 140 can also be made from a metal, such as steel or stainless steel or a polymeric material, such as an engineering grade polymer or thermal plastic polyamide. The roof rails 42'''', 44'''' are manufactured by either injection molding or cast molding the rails around different portions of pin 140. The different roof rails can be molded around pin 140 concurrently or consecutively. Additionally, it is preferred that the roof rails be formed in a single common mold. However, it should be appreciated that a roof rail encapsulating a portion of pin 140 can be formed in a first mold and then the roof rail with the pin positioned in a second mold so that the other roof rail can then be formed. It should also be appreciated that more than two roof rails can be formed together using this method.

Thus, in the fourth preferred embodiment, at least two adjacent roof rails and a joint coupling the two roof rails together are formed at the same time or substantially the same time in a common mold thereby facilitating their production and eliminating a subsequent assembly step or operation.

The preferred embodiments discussed above have been shown by way of specific examples relative to the front roof rail and the center roof rail. It should be appreciated, however, that all of the roof rails that comprise the top stack mechanism are preferably made according to one of the embodiments discussed above. It should also be appreciated that where a single end of one of the roof rails is shown and discussed, the opposite end of the roof rail will also be a composite roof rail and have a structure similar to those disclosed above with the differences being the specific configuration to facilitate a desired coupling of that roof rail with another component of the top stack mechanism. Furthermore, while specific materials have been disclosed, other materials having similar characteristics, functionalities and properties can be employed without departing from the scope of the present invention. Additionally, other methods or means of producing composite roof rails with these materials can also be employed without departing from the scope of the present invention. Furthermore, where the present invention has been shown with reference to a specific soft-top convertible roof, it should be appreciated that such reference was for exemplary purposes and that the present invention can be employed on other convertible roofs.

It should also be appreciated that while the present invention is preferred for use with roof rails for a convertible roof system, the present invention alternatively could be used to produce other components of a convertible roof system, such as roof bows, latching mechanisms, other linkages, etc. but not all of the benefits may be available. Additionally, composite roof rails of the present invention are superior to previous polymeric roof bows used in convertible roof systems in that the composite roof rails are subjected to significantly higher stresses and strains associated with operation of the top stack mechanism and are capable of withstanding such higher stresses and strains.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A convertible roof system for an automotive vehicle, the system comprising:
   a top stack mechanism operable between extended and retracted positions, said top stack mechanism including:
   (a) at least one roof bow extending transversely;
   (b) at least one composite roof rail formed with at least two different materials, said composite roof rail including:
      (i) a first member made of a first material;
      (ii) a second member made of a second material different than said first material; and
   (c) wherein a portion of said first member is secured within said second member to form a unified structural member with said second member, and said first member coupling said composite roof rail to a component of said top stack mechanism.

2. The system of claim 1, wherein said second material is a polymeric material.

3. The system of claim 2, wherein said second member is an injection molded polymeric material.

4. The system of claim 3, wherein said first member is an extruded polymeric material.

5. The system of claim 3, wherein said first member is an injection molded polymeric material.

6. The system of claim 2, wherein said first material includes a metal coating and carbon fiber.

7. The system of claim 6, wherein said first member has an extension welded to said metal coating that couples said composite roof rail to another component of said top stack mechanism.

8. The system of claim 2, wherein said first material is a metal.

9. The system of claim 2, wherein said first material is a polymeric material.

10. The system of claim 2, wherein said first material is an engineering grade polymer.

11. The system of claim 2, wherein said first material is a thermoplastic polyamide.

12. The system of claim 1, wherein said first material is stronger than said second material.

13. The system of claim 1, wherein said second member forms a majority of an exterior contour of said composite roof rail.

14. The system of claim 1, wherein said second member has an exterior surface with an integral seal retainer.

15. The system of claim 1, wherein said second member has a channel and a portion of said first member extends outwardly from said channel and couples said composite roof rail to a component of said top stack mechanism.

16. The system of claim 1, wherein said first member is coupled to at least one of another roof rail of said top stack mechanism, a link of said top stack mechanism and a roof bow of said top stack mechanism.

17. The system of claim 1, wherein a majority of said first member is encapsulated within said second member.

18. The system of claim 1, wherein an end portion of said first member has at least two extensions that are operable to couple said composite roof rail to other components of said top stack mechanism.

19. The system of claim 1, further comprising a pliable cover and wherein said top stack mechanism supports at least a portion of said cover.

20. A convertible roof system for an automotive vehicle, the system comprising:
- a top stack mechanism operable between extended and retracted positions, said top stack mechanism including a plurality of generally for-and-aft extending roof rails with at least one roof bow extending transversely therebetween;
- at least one of said roof rails being a composite roof rail formed with at least two different members, said composite roof rail including:
  - a first member forming a portion of a coupling joint of said top stack mechanism, said first member being operable to couple said composite roof rail to a component of said top stack mechanism via said coupling joint; and
  - a second member forming a majority of an exterior of said composite roof rail, said second member being attached to said first member such that said first and second members are fixed relative to one another.

21. The system of claim 20, wherein said first member forms an end portion of said composite roof rail.

22. The system of claim 21, wherein said second member forms a central portion of said composite roof rail and said composite roof rail further includes a third member forming a portion of a different coupling joint of said top stack mechanism, said third member being operable to couple said composite roof rail to a component of said top stack mechanism via said different coupling joint, and said third member being attached to said second member and forming a different end portion of said composite roof rail.

23. The system of claim 21, wherein said composite roof rail further includes a third member forming a portion of a different coupling joint of said top stack mechanism, said third member being operable to couple said composite roof rail to another component of said top stack mechanism via said different coupling joint, and said third member being attached to said second member.

24. The system of claim 20, wherein said first member is coupled to another roof rail of said top stack mechanism.

25. The system of claim 20, wherein said first member is coupled to a link of said top stack mechanism.

26. The system of claim 20, wherein said first member is coupled to a roof bow of said top stack mechanism.

27. The system of claim 20, wherein said first and second members are made from different materials.

28. The system of claim 20, wherein said first and second members are attached together with a fastener.

29. The system of claim 20, wherein said first and second members are attached together with an interference fit.

30. The system of claim 20, wherein said first and second members are attached together with an adhesive.

31. The system of claim 20, wherein each of said first and second members is made from one of aluminum, steel and magnesium.

32. The system of claim 20, wherein at least one of said first and second members is made from a polymeric material.

33. The system of claim 20, wherein said second member includes an integral seal retainer.

34. The system of claim 20, wherein said first member forms a portion of two coupling joints and said first member is operable to couple said composite roof rail to two other components of said top stack mechanism via said two coupling joints.

35. The system of claim 20, further comprising a pliable cover and wherein said top stack mechanism supports a portion of said cover.

36. A retractable composite roof rail comprising:
- a first member made of a first material; and
- a second member made of a second material,
- wherein a portion of said first member is secured within said second member to form a unified structural member that is operable to move between extended and retracted positions.

37. The composite roof rail of claim 36, wherein said second material is a polymeric material.

38. The composite roof rail of claim 37, wherein said first material is a polymeric material.

39. The composite roof rail of claim 37, wherein said first material is metal.

40. The composite roof rail of claim 37, wherein said first material includes a metal coating and carbon fiber.

41. A composite roof rail made with a mold, the composite roof rail comprising:
- a first member made from a first material; and
- a second member formed in the mold around a portion of said first member, said second member being formed from a second material.

42. The composite roof rail of claim 41, further comprising a third member formed in the mold around a portion of said first member, said third member being movable relative to said second member.

43. The composite roof rail of claim 41, further comprising a third member formed in a different mold around a portion of said first member, said third member being movable relative to said second member.

44. The composite roof rail of claim 41, wherein the mold is an injection mold and said second member is injection molded in the mold.

45. The composite roof rail of claim 41, wherein the mold is a cast mold and said second member is cast molded in the mold.

46. The composite roof rail of claim 41, wherein said first material is a polymeric material.

47. The composite roof rail of claim 41, wherein said first material includes a metal coating and carbon.

48. A method of making a composite roof rail for a convertible roof system, the method comprising:
- forming a composite roof rail with at least two different materials including:
  - (a) producing a first member of the composite roof rail with a first material;
  - (b) producing a second member of the composite roof rail with a second material; and
  - (c) attaching said second member to said first member.

49. The method of claim 48, wherein step (a) includes depositing a metallic layer.

50. The method of claim 49, wherein step (a) includes depositing said metallic layer on a carbon fiber structure.

51. The method of claim 49, wherein step (a) further includes welding an extension onto said metallic layer, said extension allowing the composite roof rail to be coupled to a component of the convertible roof system.

52. The method of claim 48, wherein:
- step (a) includes extruding said first member from a polymeric material;

step (b) includes injection molding said second member from a polymeric material, and step (c) includes encapsulating a portion of said first member within said second member while injection molding said second member.

53. The method of claim 48, wherein:

step (a) includes injection molding said first member from a polymeric material;

step (b) includes injection molding said second member from a polymeric material, and step (c) includes encapsulating a portion of said first member within said second member while injection molding said second member.

54. The method of claim 48, wherein step (b) includes producing an integral seal retainer on said second member with said second material.

55. A method of assembling a convertible roof system for an automotive vehicle wherein the convertible roof system includes a top stack mechanism operable between open and closed positions and wherein the top stack mechanism includes at least one composite roof rail having at least first and second members, the method comprising:

(a) attaching the first and second members together such that the first and second members are fixed relative to one another and form the composite roof rail; and (b) coupling the first member to another component of the top stack mechanism so that the composite roof rail is coupled to said another component of the top stack mechanism.

56. The method of claim 55, wherein (a) further includes attaching the first and second members together with a fastener.

57. The method of claim 55, wherein (a) further includes attaching the first and second members together with an interference fit.

58. The method of claim 55, wherein (a) further includes attaching the first and second members together with an adhesive.

59. The method of claim 55, wherein (b) includes pivotally coupling said first member to another component of the top stack mechanism.

60. The method of claim 55, further comprising attaching a seal to an integral seal retainer on said second member.

61. The method of claim 55, wherein prior to performing step (a) the method further comprises selecting the first member from a group of potential first members having differing configurations.

62. The method of claim 55, wherein the second member is designed for the specific automotive vehicle and prior to performing step (a) the method further comprises selecting the first member from a group of universal first members having differing configurations, each of said universal first members being operable with the second member to form the composite roof rail.

63. The method of claim 55, wherein step (a) includes attaching the first member to an end portion of the second member.

64. The method of claim 55, wherein the composite roof rail includes a third member and further including:

attaching said third member to the second member to form the composite roof rail; and coupling said third member to a different component of the top stack mechanism so that the composite roof rail is coupled to said different component of the top stack mechanism.

65. A convertible roof system for an automotive vehicle, the system comprising:

a top stack mechanism operable between extended and retracted positions, said top stack mechanism including:

at least one composite roof rail formed with at least two different members, said composite roof rail including:

a first member forming a portion of a coupling joint of said top stack mechanism, said first member being operable to couple said composite roof rail to a component of said top stack mechanism via said coupling joint; and a second member forming a majority of an exterior of said composite roof rail, said second member being attached to said first member, wherein said first and second members are made from different materials.

66. A convertible roof system for an automotive vehicle, the system comprising:

a top stack mechanism operable between extended and retracted positions, said top stack mechanism including:

at least one composite roof rail formed with at least two different members, said composite roof rail including:

a first member forming a portion of a coupling joint of said top stack mechanism, said first member being operable to couple said composite roof rail to a component of said top stack mechanism via said coupling joint; and a second member forming a majority of an exterior of said composite roof rail, said second member being attached to said first member, wherein said first and second members are attached together with an adhesive.

67. A convertible roof system for an automotive vehicle, the system comprising:

a top stack mechanism operable between extended and retracted positions, said top stack mechanism including:

at least one composite roof rail formed with at least two different members, said composite roof rail including:

a first member forming a portion of a coupling joint of said top stack mechanism, said first member being operable to couple said composite roof rail to a component of said top stack mechanism via said coupling joint; and a second member forming a majority of an exterior of said composite roof rail, said second member being attached to said first member, wherein at least one of said first and second members is made from a polymeric material.

68. The system of claim 1, wherein said composite roof rail extends in a generally fore-and-aft direction.

69. The composite roof rail of claim 36, wherein said unified structural member extends in a generally fore-and-aft direction.

70. The composite roof rail of claim 51, wherein the composite roof rail extends in a generally fore-and-aft direction.

71. The method of claim 48, wherein the composite roof rail extends in a generally fore-and-aft direction.

72. The method of claim 55, wherein the composite roof rail extends in a generally fore-and-aft direction.

* * * * *

UNITED STATES PATENT AND TRADEMARK OFFICE
CERTIFICATE OF CORRECTION

| | | |
|---|---|---|
| PATENT NO. | : 7,111,892 B2 | Page 1 of 1 |
| APPLICATION NO. | : 10/838004 | |
| DATED | : September 26, 2006 | |
| INVENTOR(S) | : Arthur L. MacNee, III and Bradley R. Garska | |

It is certified that error appears in the above-identified patent and that said Letters Patent is hereby corrected as shown below:

Column 13, line 12, Claim 20, "for-and-aft" should be --fore-and-aft--.

Column 16, line 59, Claim 70, "51" should be --41--.

Signed and Sealed this

Twenty-third Day of January, 2007

JON W. DUDAS
*Director of the United States Patent and Trademark Office*